United States Patent [19]

Delves et al.

[11] Patent Number: 4,718,464
[45] Date of Patent: Jan. 12, 1988

[54] BAG FILLING APPARATUS

[76] Inventors: Elsworth R. Delves, c/o Purpose Engineers Limited, Delves Road, Heanor Gate, Industrial Estate, Heanor, Derbyshire; James I. Davidson, c/o Sidian Trading Limited, Peatling Parve, Lutterworth, Leicestershire, both of England

[21] Appl. No.: 889,350

[22] Filed: Jul. 25, 1986

[30] Foreign Application Priority Data

Aug. 2, 1985 [GB] United Kingdom ................. 8519451

[51] Int. Cl.$^4$ ............................ B65B 1/22; B65B 1/32
[52] U.S. Cl. ......................................... 141/75; 141/83; 177/211
[58] Field of Search ....................... 141/10, 75, 76, 83; 177/1, 60, 116, 118, 160, 210 R, 211

[56] References Cited

U.S. PATENT DOCUMENTS

| | | | |
|---|---|---|---|
| 1,359,586 | 11/1920 | Flagg | 177/160 |
| 2,439,146 | 4/1948 | Ruge | 177/211 X |
| 2,582,886 | 1/1952 | Ruge | 177/211 X |
| 2,765,816 | 10/1956 | Carter | 141/51 X |
| 3,261,379 | 7/1966 | Stockel et al. | 141/76 X |
| 3,376,905 | 4/1968 | Lau | 141/83 X |
| 3,505,790 | 4/1970 | Rothemich | 177/211 X |
| 3,837,379 | 9/1974 | McDonald, Jr. et al. | 141/83 X |
| 4,182,386 | 1/1980 | Alack | 141/83 |
| 4,467,845 | 8/1984 | Strand et al. | 141/10 |
| 4,579,152 | 4/1986 | Myklebust et al. | 141/10 |

FOREIGN PATENT DOCUMENTS

| | | | |
|---|---|---|---|
| 147526 | 4/1981 | Fed. Rep. of Germany | 141/10 |
| 84/00138 | 1/1984 | PCT Int'l Appl. | 141/83 |

*Primary Examiner*—Mark J. Thronson
*Attorney, Agent, or Firm*—W. Thad Adams, III

[57] ABSTRACT

A bag filling apparatus for large bags of around 1 ton capacity, includes arms for suspending the bag to be filled on the frame of the apparatus and a bag base support for supporting the base of the bag being filled, the support being vertically movable into and out of contact with the bag base. The bag base support is adjustable to cater for bags of different lengths and vibrates to assist in material settlement. The bag suspension apparatus has a weighing arrangement for weighing the filled bag.

7 Claims, 5 Drawing Figures

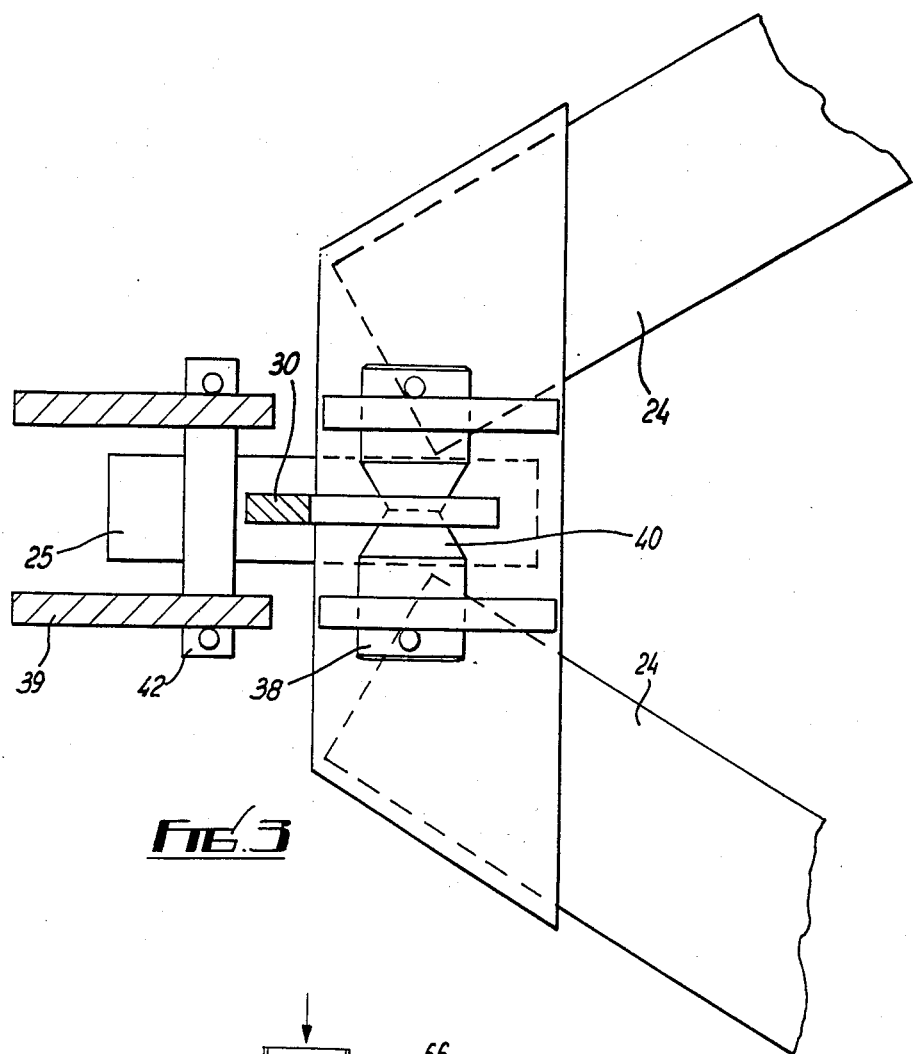
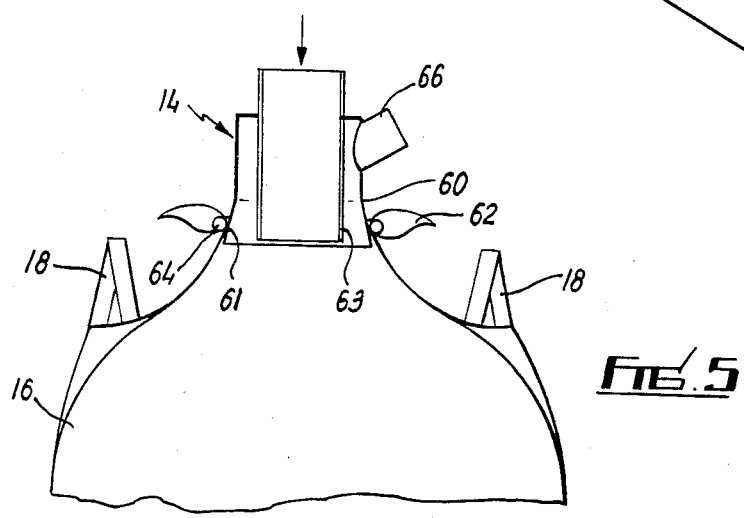

BAG FILLING APPARATUS

The present invention concerns improvements in or relating to bag filling apparatus, especially but not exclusively apparatus for filling relatively large bags (for example of 1 tonne capacity). The bags may be lined or unlined and in this specification the term bag is used as a generic term embracing a bag and/or its liner.

Apparatus is known for filling such bags but is generally incorporated in relatively large bag filling and handling plant whose cost is in excess of that which is within the reach of relatively small operators.

Currently small operators normally fill large bags utilising a system which is almost entirely manual. The system involves suspending a bag beneath the outlet of a storage hopper, manually opening a discharge valve on the hopper until the bag is filled and closing the valve at the end of the filling operation. This system has numerous disadvantages. If the initial flow of material from the hopper is not carefully monitored and too great a flow of material is discharged there is a danger that the impact load of the material in the bag will damage it. Additionally, any folds in the material of the bag may not be filled and the material therein may not be completely compacted. These latter disadvantages can only be remedied by manually disturbing the bag to allow the contents to settle. A further disadvantage is that the filled bag must then be transported to a weighing apparatus remote from the hopper where its contents are weighed and it will be apparent that problems and inconvenience will arise if the weight of the contents is not at the predetermined value.

If it is over level material has to be removed by hand; alternatively if it is under level the bag must be placed again under the hopper so that more material can be added. Clearly this "hit-or-miss" weighing system is time consuming and when it is realised that the material in the bag could be powder the working conditions in which the operator works can often be uncomfortable or possibly dangerous.

Certain known weighing apparatus has included two load cells but it has been found that they have not given satisfactorily accurate readings, probably as a result of the extraneous stresses built into the machine as a result, for example, of support arrangements for the frame.

Objects of the various aspects of the present invention are to obviate or mitigate these and other disadvantages.

According to the present invention there is provided a bag filling apparatus comprising a support frame, suspension means on said support frame adapted to carry a bag to be filled, material inlet means for supplying material to be deposited in the bag and a base support for the base of the bag being filled carried by the support frame and mounted for vertical movement into and out of contact with the base of said bag.

Another aspect of the present invention provides a bag filling apparatus comprising a support frame, suspension means on said support frame adapted to carry a bag to be filled and material inlet means for supplying material to be deposited in the bag, said suspension means being attached to the framework by pins incorporating strain gauges such that they act as load cells giving an indication of the weight suspended therefrom, from which indication the weight of the contents of a bag to be filled can be determined.

A further aspect of the present invention provides a weighing apparatus including a frame for supporting an item to be weighed, the frame being mounted on a rigid support structure by three load cells arranged with their longitudinal axes at an angle to the vertical and horizontal.

An embodiment of the present invention will now be described by way of example only with reference to the accompanying drawings, in which:

FIG. 3 is a sectional plan on the line III—III of FIG. 4 of a load cell and its mounting means;

FIG. 5 is a detailed sectional elevation of material inlet means of the apparatus.

Figure 1:
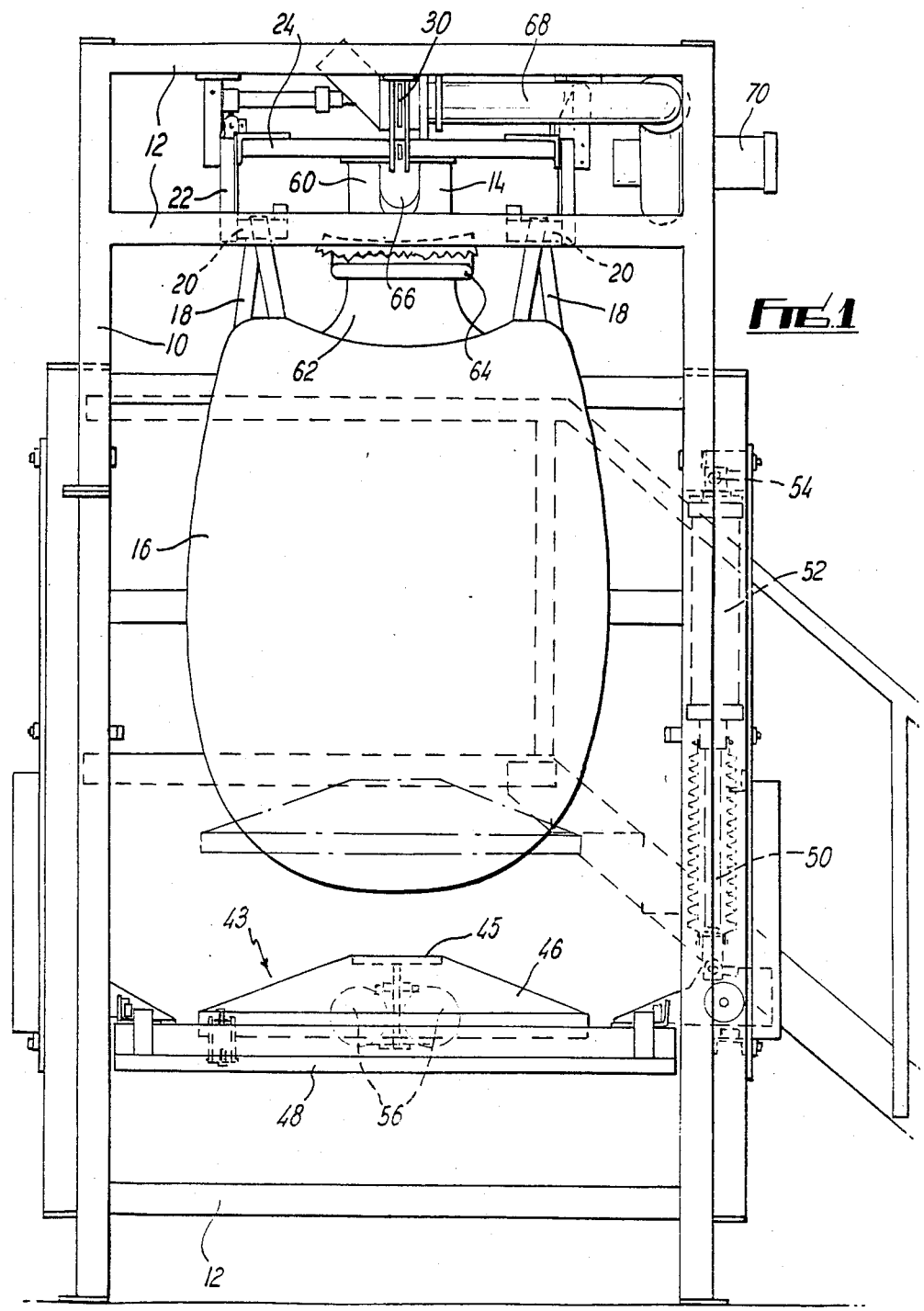
FIG. 1 shows an elevation of a bag filling and weighing apparatus.

A bag filling and weighing apparatus comprises a framework having four vertical posts 10 connected by top and bottom cross-members 12. The framework is located beneath a material supply, for example a hopper, the outlet from which is connected to material inlet means shown generally by the reference numeral 14.

Figure 2:
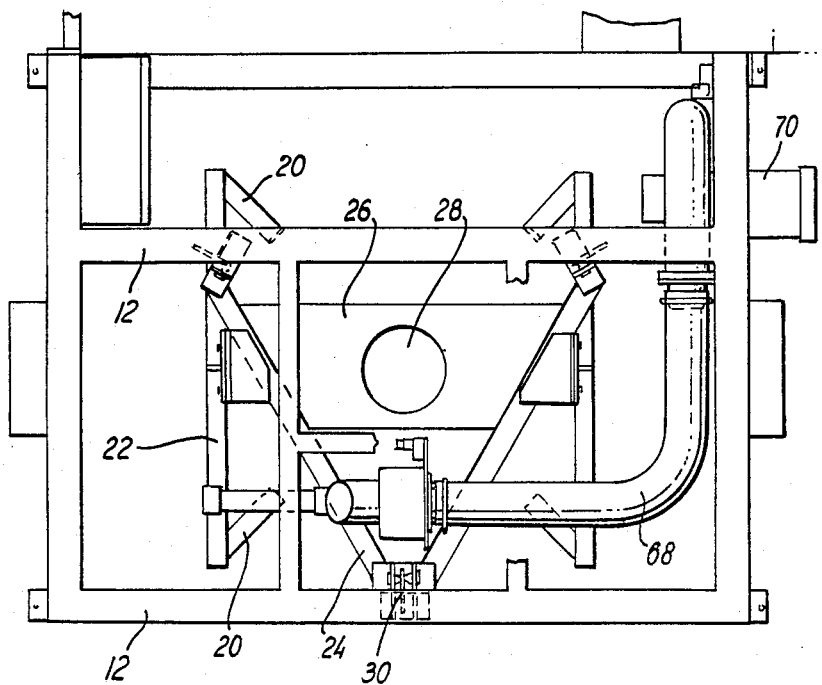
FIG. 2 shows a plan of the filling and weighing apparatus.

A bag 16 to be filled has either two or four handles 18 at its corners. The handles are looped over arms 20 which project inwardly from sub-frame members 22 which are supported by a bag support frame 24 which, on consideration of FIG. 2, can be seen to be triangular in plan. The triangular frame 24 has a bag neck support assembly 26 provided with a filling opening 28. The frame 24 is suspended from the cross-members 12 by three load cells 30 which are more clearly illustrated in FIGS. 3 and 4. Each load cell is pivotally mounted to the frame 24 and to the support structure 12 and is arranged with its axis at 30° to the vertical. Each load cell comprises a rectangular plate having mounting holes 32 at each end thereof. The width of the plate is reduced between its ends and a strain gauge 34 is fixed to the reduced width portion in known manner, the electrical leads 38 from the strain gauge being connected to a signalling and computing arrangement which summates the signals from the three gauges and displays a reading of the weight carried by the frame 24. The load cells 30 are arranged in a plane which intersects the apices of the frame 24.

FIG. 3 shows that the pivotal connection of the cell 30 to the frame 24 comprises a support pin 38 about which the load cell is universally pivotally mounted. The pin 38 has a diameter which is slightly greater than the diameter of the hole 32 in the plate 30 but to allow for the required universal pivotal movement of the plate 30 about the pin 38 the pin has a waisted portion 40 of reduced diameter.

Figure 4:
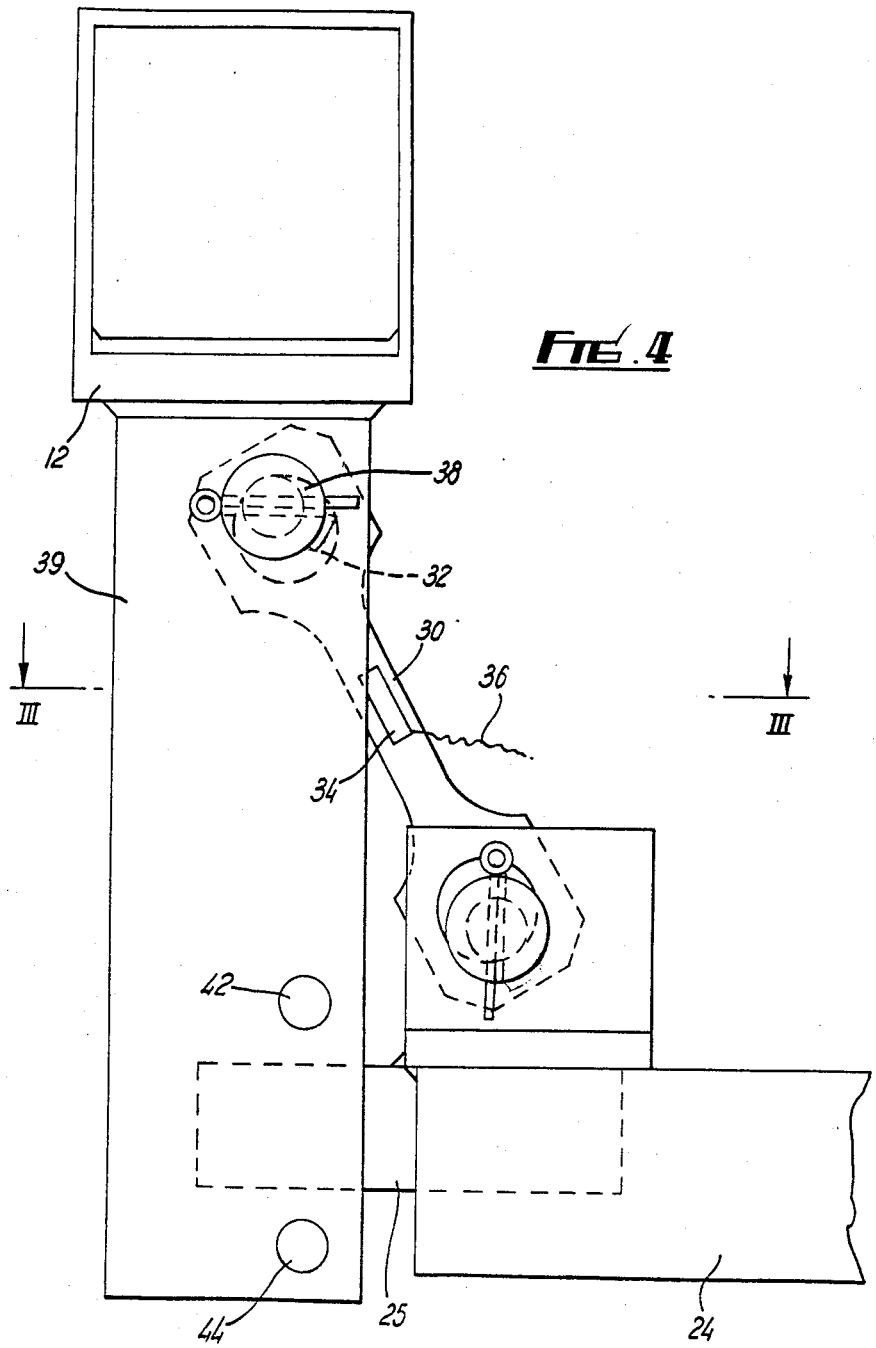
FIG. 4 is an elevation of the load cell and mounting means.

To prevent excess tipping movement of the frame due, for example, to uneven loading or to fracture of one of the load cells a member 39 carrying the upper pivot pin 38 is provided with upper and lower stop means which may take any convenient form but which are illustrated in FIG. 4 as upper and lower abutment members 42, 44 respectively. The frame 24 has an extension piece 25 extending into the space between the pins 42 and 44.

As the bag 16 is being filled its lower end may be supported by a base support 43 which has a raised central plate 45 and a downwardly inclined peripheral plate 46, the support being carried by a bottom member 48 suspended by connection rods 50 to the pistons of two further piston and cylinder devices 52 mounted on a cross-member 54 extending between the uprights 10.

A vibrator assembly is connected to the central plate 45 to assist in compacting material in the bag during filling. The vibrator assembly comprises two unbalanced counter-rotating motors 56 mounted to the support 43.

The inlet means 14 comprises a tubular member 60 which has an outwardly flared lower open end 61. Prior to the commencement of a filling cycle the neck 62 of the bag is arranged around the outer periphery of the member 60 and a ring 64 which is slidably mounted on the outer surface of the member 14 but has an internal diameter less than the greatest external diameter of the flared portion is allowed to descend over the member until it traps the bag neck between itself and the said flared portion. A material filling line 63 is suspended from the underside of the plate 26 by a flexible connection, for example a stocking made from nylon material, the filling tube supporting the member 14.

An air duct 66 projects from the side of the member 14 and is connected, again by means of a flexible stocking of nylon, to a duct 68 connected to a fan 70 which is capable of supplying air to or exhausting air from the interior of the bag to, respectively, inflate the bag prior to filling and remove dust laden air exhausting from the bag during filling.

In operation, after the fitment of a bag to the apparatus as described above, the piston and cylinder devices 52 are actuated to bring the base support 43 into contact with the base of the bag which has been inflated by the passage of air through the duct 66. The electronic means connected to the strain gauges 36 can then be zeroed and a valve on the hopper may be opened fully to allow full flow of material into the bag. During this filling the duct 66 is exhausting dust laden air from the interior of the bag. The weighing arrangement monitors the weight of the contents of the bag during filling and when the weight is approaching a predetermined value the valve and the hopper can be returned to the trickle feed position so that the final filling of the bag, which is achieved when the weighing apparatus detects the exact weight of material required, can be carefully controlled.

During the filling operations the motors 56 can be rotated to vibrate the support member 43 thereby compacting material in the bag to allow increased filling efficiency.

When the bag has been filled the neck is detached from the filling member 14 by raising the ring 64 and a fork-lift truck can insert a pallet beneath the filled bag and the lowered support plate to raise the bag and allow the handles to be unhooked prior to removing the filled bag from the apparatus.

Various modifications can be made without departing from the scope of the invention. For example the material inlet means can assume different configurations, the weighing arrangement can be differently arranged, for example by sensing pressure changes in the cylinders 52, and the bag support may take any suitable form.

We claim:

1. A bag filling apparatus comprises:
   (a) a rigid support frame;
   (b) a material inlet for material to be deposited in the bag;
   (c) arms connected to the support frame adapted to carry handles on the top of a bag to be filled to suspend the bag with its top opening in registry with the material inlet;
   (d) a bag base support movably mounted on the support frame below the material inlet;
   (e) a bag base contacting member having inwardly inclined surfaces forming the upper face of the bag base support;
   (f) a raising and lowering assembly connecting the bag base support with the support frame and operable to raise or lower the bag base support into contact or away from contact with the base of a bag suspended from the frame, said assembly including at least one connection incorporating a piston and cylinder device, connected between the support frame and the bag base support;
   (g) a sub-frame movably suspended from said support frame around the material inlet; and
   (h) three tensile connecting members pivotally mounted between the support frame and the sub-frame to suspend the subframe from the support frame, at least one strain gauge being provided on each connecting member whereby it acts as a load cell, each connecting member being arranged such that a respective connecting line joining a connection point with the support frame and its connection point with the subframe lies at an angle to the vertical and to the horizontal and at an angle of 120° to a similar line of a neighboring member.

2. A bag filling apparatus as claimed in claim 1, including a vibrating assembly for vibrating said bag base support.

3. A bag filling apparatus as claimed in claim 1, wherein each connecting line lies at an angle of 30° to the vertical.

4. A bag filling apparatus as claimed in claim 1, in which the connection of the raising and lowering assembly includes an adjustable length member connected to said piston and cylinder device whereby bags of different depths may be supported by the bag base support.

5. A bag filling apparatus as claimed in claim 1, in which each tensile connecting member comprises a plate having pivotal mounting means at each end for connection to the support frame and sub-frame and a reduced thickness center portion to which is attached the or each strain gauge.

6. A bag filling apparatus as claimed in claim 5, in which each of said pivotal mounting means comprises a passage through the plate and a pin having a reduced diameter center portion passing through the passage and fixable to the respective frame.

7. A bag filling apparatus as claimed in claim 1, in which the material inlet includes a first member mounted on the sub-frame and communicating with a material source on the support frame and a flexible stocking connectable between said first member and the material source.

* * * * *